Patented Aug. 16, 1932

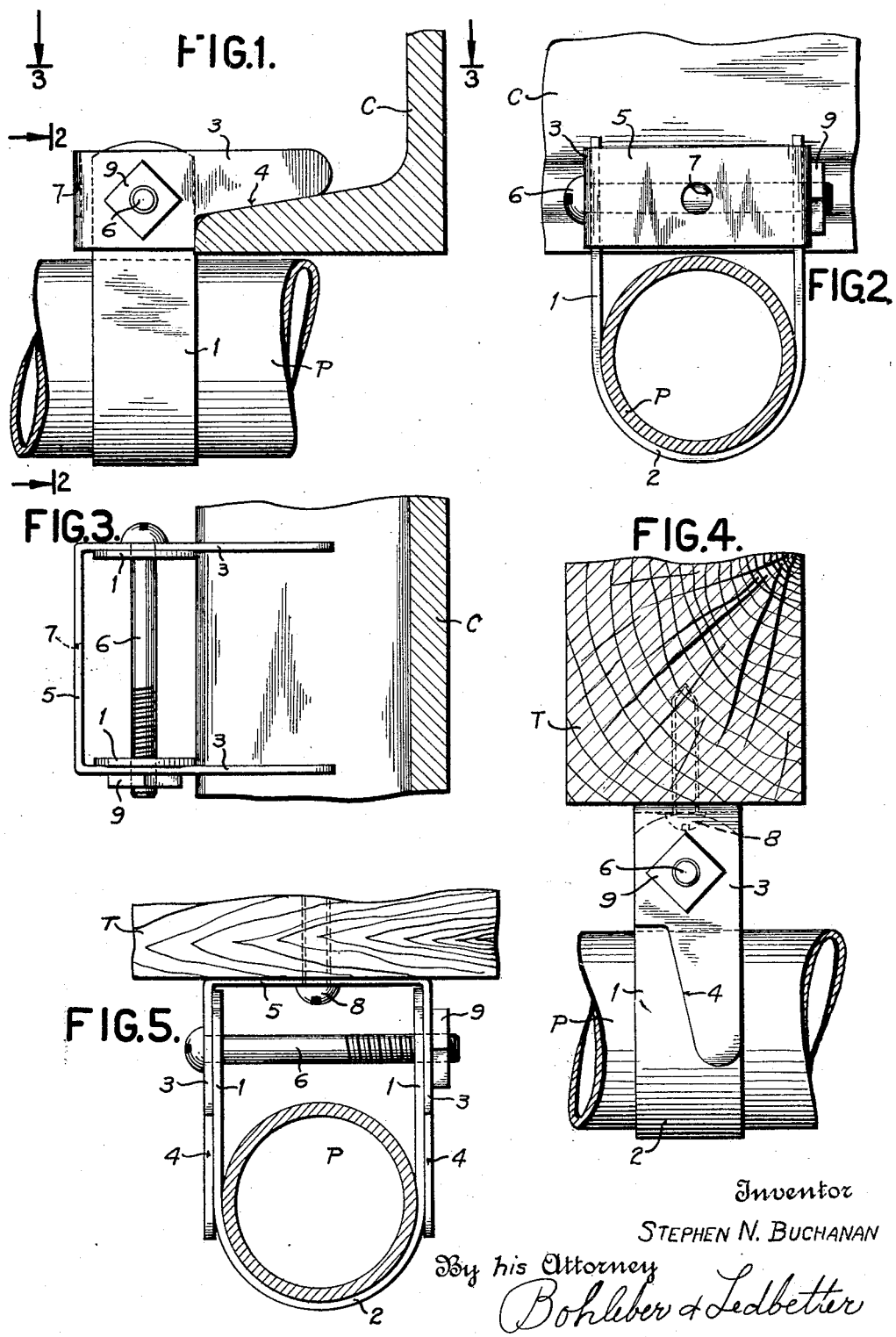

1,872,061

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

CONDUIT SUPPORT

Application filed August 13, 1929. Serial No. 385,615.

This invention relates to conduit supports by which conduits and in particular conduits carrying electrical wiring are supported or suspended from the ceiling of a building or structure of any sort by means of a support which is capable of attachment to a steel beam or a ceiling of any kind. Usually two types of supports are supplied for this purpose, one being adapted to support a conduit from an I-beam or channel iron and the other being suitable for attachment to wooden structure such as beams and planks or to smooth surfaced ceilings of any sort, so that the workman must necessarily have available two styles of conduit supports for any wiring installation. A single fixture support which performs the two functions of the two supports customarily used has obvious advantages.

It is an object of this invention to provide a single conduit support which may be suspended from or be attachable to both steel beams and to any other structure in order to support a conduit therefrom.

Another object of the invention is to provide a fixture support for securing conduit to ceilings or ceiling structure of any kind.

Other objects of the invention will be more apparent from the following detailed description of the invention when taken in connection with the accompanying drawing in which, Figure 1 is a view showing the conduit support carrying a conduit, the support being suspended from a steel beam.

Figure 2 is an end view of the support suspended from a steel beam and carrying a conduit for electrical wiring.

Figure 3 is a view looking down on the conduit support.

Figure 4 shows the support carrying a conduit pipe and showing the manner in which the support is secured to the wooden structure of a building such as a beam or planking or any structure other than a steel beam.

Figure 5 is an end view of the support shown in Figure 4.

The conduit support is constructed of two pieces or members, one of which serves as a pipe clamp or pipe cradle and the other serves as the attaching or suspending member by which the conduit pipe support is attached to or suspended from any type of building structure. Means also are provided to clamp the support upon the pipe and lock the two members together in desired angular relation with each other.

The conduit support consists then of a U-shaped member 1, having a rounded or semicircumferential portion 2 corresponding to a pipe circumference, upon which the conduit pipe P rests or is received and may be said to be cradled therein. This U-shaped member may also be termed pipe receiving means. The arms of the U-shaped member are flexible so that upon squeezing them together with a conduit pipe cradled therein, the pipe is gripped or clamped between the two arms of the U. The upper end of each arm is provided with a hole for receiving a bolt 6 therethrough for securing contraction of the flexible arms of the U-shaped pipe receiving means to clamp a pipe between the arms as will be described.

The other member of the conduit support is also a U-shaped member 3 having an angular seat 4 for engagement with the usual angular flange of a beam such as the channel beam C, so that the arms will seat securely upon this flange. Each arm of this second U-shaped member is provided with holes adjacent to the connecting piece 5 of the U-shaped member or at the base of the arms forming the U, to receive the bolt 6. The bolt 6 passes through the holes provided therefor in both U-shaped members and provides a pivot or hinge permitting angular positioning of the two members with respect to each other so that the arms 3 may project at right angles to the pipe retaining U-shaped member or may extend in alignment therewith as desired. The bolt has then a double function and may be viewed in one instance as a pin only for providing a hinge or pivot and when threaded and provided with a nut it is capable of a second function, namely, the clamping of the two U-shaped members in any predetermined relation and in the second instance the bolt may be viewed as a single element or means having both functions.

The second or hinged U-shaped member 3 has a hole 7 in the connecting member 5 to receive a bolt or wood screw 8 shown in Figures 4 and 5 for securing the conduit support to flat ceilings or to wooden structure of any sort. It is clear that a hole may be provided through any part of ceiling and the conduit support suspended therefrom by a bolt passing through the bolt hole 7 and the hole in the ceiling.

The conduit support is used for supporting pipe from steel beams by inserting a pipe P into the U-shaped member 1 and rotating the hinged U-shaped member 5 upon the bolt 6 until the arms of the U-shaped member 3 are horizontal and the seats 4 engage with the angular flange of the beam C. The nut 9 is then tightened which draws the arms of the U-shaped member 1 together to clamp the pipe P therebetween and also to clamp the two U-shaped members together against rotation so that they will remain in fixed relative position. If through inadvertence the nut is not tightened sufficiently to clamp the two members together against relative rotation, and the arms 3 begin to tilt up from the position shown in Figure 1, the connecting portion 5 of the U-shaped member 3 will engage the arms of the stationary U-shaped member 1 and prevent any further relative rotation between the members. If the building upon which the conduit is mounted is subject to vibration tending to cause the pipe and conduit support to slide longitudinally, the pipe may be anchored against longitudinal movement at any point.

When the conduit support is to be used in order to support a conduit pipe from a flat ceiling or from wooden structure, the arms of the hinged U-shaped member 3 are rotated until they are in alignment with the arms of the U-shaped member 1 so that the connecting piece and the bolt hole 7 are uppermost and enable the wood screw 8 to be inserted into the timber T or any other wooden structure. As previously discussed, a hole may be provided through the ceiling and a bolt utilized to secure the conduit support to the ceiling. In this use of the support the clamping bolt 6 may be tightened to clamp the conduit P between the arms of the pipe receiving U-shaped member 1, although neither clamping of the pipe nor clamping the U-shaped members against relative rotation, is essential for this use of the support. It is to be understood that the hinged member may be so constructed for instance with a hook so that the support may be suspended from rods or other structure in addition to the two described. In other words, any number of suspension or attaching means may be provided upon the hinged member. Again, although the pivot or hinge has the double function of hingedly securing the two members together and also clamping them in desired relative relation, it is obvious that other means may be provided for clamping the two members together such as a bolt threaded in one member and engaging the other as is shown to any mechanic.

The invention, in its broad sense, consists, therefore, of two members, one of which retains or carries the conduit pipe which pipe may be clamped within the member, and the other member is adjustable relatively thereto, and has provided thereon at least two means, it being understood that other means may be provided, whereby the support may be attached to any type of construction met with in building work. It is also to be understood that the invention is not to be limited in scope by the specific description given herein, and that various modifications within the skill of a mechanic are contemplated without deviating from the scope of the invention.

What is claimed is:

1. A conduit support for securing conduit to steel beams or other structure comprising a pipe retaining member, a member pivotally carried thereby, and a plurality of means of different forms carried by the pivoted member for suspending the support from various forms of structure.

2. A conduit support for securing conduit to steel beams or other structure comprising a pipe retaining member, a member pivotally carried thereby, a plurality of means of different forms carried by the pivoted member for suspending the support from various forms of structure, and means to clamp the pivoted member in predetermined relation with the pipe retaining member.

3. A conduit support for securing conduit to steel beams or other structure comprising a U-shaped pipe retaining member, a second U-shaped member pivotally carried thereby, and a plurality of means carried by the pivoted member for suspending the support from various forms of structure.

4. A conduit support for securing conduit to steel beams or other structural members comprising a U-shaped pipe retaining member, a second U-shaped member hingedly carried thereby, an angular seat upon the arms of the second U-shaped member effective to suspend the support from a structural member when the arms extend substantially at right angles to the pipe retaining member, and means to clamp the hinged member to the pipe retaining member so that the arms of the second U-shaped member extend substantially at right angles to the pipe retaining member.

5. A conduit support for securing conduit to steel beams or other structural members comprising a U-shaped pipe retaining member, a clamping bolt passing through the arms of said U-shaped pipe retaining member to clamp a pipe therein, a second U-shaped member carried by said bolt and pivotal thereon, said bolt also clamping the members together in predetermined angular position, and a plurality of means provided upon said pivotal U-shaped member for suspending the support from structural members.

6. A conduit support for securing conduit to steel beams or other structural members comprising a U-shaped pipe retaining member, a second U-shaped member, a pivot securing the two members pivotally together passing through the pipe retaining member at a point adjacent to the end of its arms and passing through the second of the U-shaped members at the base of the arms, a seat upon the arms of the second member for engagement with a structural member, and means to clamp the two members in predetermined relation.

7. A conduit support for securing conduit to steel beams or other structural members comprising a U-shaped pipe retaining member, a clamping bolt passing through the arms of said U-shaped pipe retaining member to clamp a pipe therein, a second U-shaped member pivotally carried by said bolt at the base of the arms of the U providing angularly adjustable arms, said bolt also clamping the U-shaped members togethers in predetermined angular relation, a seat upon the arms of the pivoted U-shaped member for engagement with a structural member, and other means providing additional attachment for the support.

8. A conduit support for securing conduit to steel beams or other structure comprising a U-shaped pipe retaining member, a clamping bolt passing through the arms of said U-shaped pipe retaining member to clamp a pipe therein, a second U-shaped member pivotally carried by said bolt at the base of the arms of the U providing angularly adjustable arms, said bolt also clamping the U-shaped members together in predetermined angular relation, a seat upon the arms of the pivoted U-shaped member, other means providing additional attachment for the support, and stop means to prevent inadvertent rotation of the two U-shaped members from the right angle position thereof.

In testimony whereof I affix my signature.

STEPHEN N. BUCHANAN.